(12) United States Patent
Newby (10) Patent No.: US 7,056,487 B2
(45) Date of Patent: Jun. 6, 2006

(54) GAS CLEANING SYSTEM AND METHOD

(75) Inventor: Richard Allen Newby, Pittsburgh, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 354 days.

(21) Appl. No.: 10/456,037

(22) Filed: Jun. 6, 2003

(65) Prior Publication Data

US 2004/0247509 A1 Dec. 9, 2004

(51) Int. Cl.
- *C01B 3/24* (2006.01)
- *B01D 53/50* (2006.01)
- *B01D 53/68* (2006.01)
- *B32B 27/02* (2006.01)

(52) U.S. Cl. .............. 423/650; 423/240 R; 423/242.1; 423/247; 423/215.5; 422/170; 422/171

(58) Field of Classification Search ............ 423/240 R, 423/242.1, 247, 215.5, 650; 422/170, 171
See application file for complete search history.

(56) References Cited

U.S. PATENT DOCUMENTS

| | | | |
|---|---|---|---|
| 4,343,631 A | 8/1982 | Ciliberti | |
| 4,668,489 A | 5/1987 | Alexander et al. | |
| 4,973,459 A | 11/1990 | Lippert et al. | |
| 5,118,480 A | 6/1992 | Cook et al. | |
| 5,403,366 A * | 4/1995 | Leininger et al. | 48/197 R |
| H1539 H | 6/1996 | Mahagaokar et al. | |
| 5,540,896 A | 7/1996 | Newby | |
| 5,611,963 A | 3/1997 | Unger | |
| 5,827,352 A | 10/1998 | Altman et al. | |
| 2002/0059864 A1 | 5/2002 | Janssen et al. | |
| 2002/0150516 A1 | 10/2002 | Pahlman et al. | |
| 2002/0168302 A1 | 11/2002 | Pahlman et al. | |

FOREIGN PATENT DOCUMENTS

WO WO 94/21351 9/1994

OTHER PUBLICATIONS

Newby, R.A., F.S. Lau, R. B. Slimane, and S. C. Jain, "Development of the Ultra-Clean Dry Cleanup Process for Coal-Based Syngases," paper for presentation at the 5th Int. Symp. on Gas Cleaning at High Temperature, Morgantown, WV, Sep. 2002.

(Continued)

*Primary Examiner*—Colleen P. Cooke (57) ABSTRACT

A gas cleaning system for removing at least a portion of contaminants, such as halides, sulfur, particulates, mercury, and others, from a synthesis gas (syngas). The gas cleaning system may include one or more filter vessels coupled in series for removing halides, particulates, and sulfur from the syngas. The gas cleaning system may be operated by receiving gas at a first temperature and pressure and dropping the temperature of the syngas as the gas flows through the system. The gas cleaning system may be used for an application requiring clean syngas, such as, but not limited to, fuel cell power generation, IGCC power generation, and chemical synthesis.

16 Claims, 3 Drawing Sheets

OTHER PUBLICATIONS

Newby, R.A., F.S. Lau, R. B. Slimane, and S. C. Jain, "PDU Testing of the Ultra-Clean Dry Cleanup Process for Coal-Based Syngases," paper for presentation at the Nineteenth Annual Int. Pittsburgh Coal Conf., Sep. 2002.

Newby, R.A., E. E. Smeltzer, T. E. Lippert, R. B. Slimane, O. M. Akpolat, K. Pandya, F. S. Lau, J. Abbasian, B. E. Williams, D. Leppin, "Novel Gas Cleaning/Conditioning for Integrated Gasification Combined Cycle," Base Program Final Report to DOE/NETL under DOE Contract Number: DE-AC26-99FT40674, Aug. 2001 (not publicly released yet).

* cited by examiner

GAS CLEANING SYSTEM AND METHOD

STATEMENT REGARDING FEDERALLY SPONSORED RESEARCH

Development of this invention was supported in part by the United States Department of Energy, Contract No. DE-AC26-99FT40674. Accordingly, the United States Government may have certain rights in this invention.

FIELD OF THE INVENTION

This invention is directed generally to gas cleaning systems and processes, and more particularly to gas cleaning systems and processes for cleaning synthesis gas.

BACKGROUND

Many industrial processes use synthesis gas, which is otherwise known as syngas, for power generation, chemical synthesis, or other applications. Syngas primarily consists of hydrogen gas and carbon monoxide. Syngas can be produced from most kinds of hydrocarbon, including, but not limited to coal, oil and natural gas, by the application of high temperature and steam. Syngas can be burned, separated into carbon monoxide and hydrogen, or converted to a liquid fuel by processes like the Fischer-Tropsch process. In addition, syngas can be converted into methane, methanol, ammonia and other chemicals. The production of syngas can create substantial polluting emissions, such as, but not limited to, $H_2S$ and $CO_2$. Combustion of syngas can also produce other polluting emissions, including $NO_x$.

Conventional gas cleaning technologies are often used to remove these contaminants; however, disposal of the byproducts of the cleaning process can be expensive. For instance, conventional gas cleaning technologies for coal derived gases typically include a series of water scrubbers and low-temperature solvent absorption gas cleaning steps to reduce the concentration of the contaminants to an acceptable level for chemical synthesis, such as methanol production, for integrated gasification combined cycle (IGCC) power generation applications, or for other applications.

Typically, a conventional syngas cleaning process begins with cooling raw syngas to a relatively low temperature. The syngas is then passed through a water venturi scrubber to remove particulates from the syngas. The syngas is further cooled to form a condensate stream and a nearly dry syngas that is scrubbed with water to remove ammonia and halides from the syngas. This operation generates highly contaminated water requiring considerable treatment. The temperature of the syngas is then reduced to about 100 degrees Fahrenheit to reduce the concentration of mercury to a desired amount by passing the syngas through a packed bed of sulfur-impregnated activated carbon, which is an expensive sorbent.

The dry syngas is often chilled or refrigerated and scrubbed with an absorbent to remove sulfur contained in the gas. Some absorbents may require hydrolysis conversion of COS to $H_2S$ to achieve high levels of sulfur removal. One of the most effective absorbents for removing sulfur is methanol at temperatures as low as −100 degrees Fahrenheit. Methanol is used in the Rectisol desulfurization process. The Rectisol desulfurization process does not require hydrolysis of COS to $H_2S$ and can reduce sulfur concentrations to relatively low levels in syngas. However, the Rectisol process requires a substantial investment in equipment and incurs high power costs. In addition, the Rectisol process effectively and undesirably for IGCC removes $CO_2$ from the syngas.

The syngas is then reheated to about 700 degrees Fahrenheit and passed through a fixed bed of sulfur sorbent, such as a ZnO guard bed, to further reduce the sulfur concentration in the syngas. Reheating the syngas consumes energy and is inefficient.

Many conventional syngas cleaning processes function well, and some can meet very stringent levels of contaminant removal need for chemical synthesis. However, most are expensive to construct and operate. In addition, most systems require complex water treatment systems to remove the contaminants from the water generated during the cleaning process. Moreover, many of the conventional systems result in "drying" of the gas and partial $CO_2$ removal, which results in an energy loss that is not acceptable for some applications.

In addition, conventional syngas often contains products that can harm power generation in IGCC applications such as metal cabonyls and particles from corrosion of the syngas pipes. In particular, these products can be deposited in the turbines and can cause erosion damage in the turbines.

Thus, a need exists for a more efficient system and method for cleaning gas.

SUMMARY OF THE INVENTION

This invention relates to a gas cleaning system for removing contaminants from feedstock gas, such as syngas or other gases. Syngas may be defined as any gas produced through gasification of a biomass, such as, but not limited to, coal, oil and natural gas, by the application of high temperature and steam. The gas cleaning system may remove at least a portion of one of the following: halides, sulfur, mercury and other trace metals. In at least one embodiment, the gas cleaning system receives a feedstock gas from a feedstock gas source, which may be, but is not limited to, a coal gasifier, and passes the feedstock gas through a plurality of filter vessels to remove at least a portion of contaminants, which may include, but is not limited to, the halides, sulfur, particulate, and mercury concentrations, from the gas, while gradually reducing the temperature and pressure throughout the system. In at least one embodiment, the filters may remove a substantial portion of the contaminants from the feedstock gas to reduce levels of these contaminants to levels at or below governing guidelines. The gas cleaning system may be adapted to clean gas usable in chemical synthesis applications, gas usable for fuel cell power generation, gas usable for IGCC power generation, and gas usable for other applications.

In at least one embodiment, the gas cleaning system for cleaning feedstock gas may include at least one first filter vessel capable of operating at a first temperature and removing at least a portion, if not almost all, of particulates contained in a feedstock gas. In one embodiment, the first temperature may vary between about 700 degrees Fahrenheit and about 1,200 degrees Fahrenheit. The first filter vessel may also be capable of removing at least a portion of at least one halide using at least one sorbent mixed with the feedstock gas. The sorbents may be mixed with the feedstock gas and the sorbent may adsorb the halides. Filter elements in the first filter vessel may filter out the sorbent particles and the halides attached to the sorbent particles. In at least one embodiment, the first filter vessel may be capable of removing a substantial portion of the halides contained in a feedstock gas. The first filter vessel may be formed from one or more filter elements. The first filter may remove one or more halides using one or more sorbents. The sorbent may be injected into the feedstock gas as the gas enters the first filter vessel or otherwise mixed with the feedstock gas.

The gas cleaning system may also include at least one desulfurization system capable of operating substantially at the first temperature, which may be a temperature equal to or slightly less than the first temperature, for removing at least a portion of sulfur contained in the feedstock gas. In other embodiments, the desulfurization system may operate at other temperatures.

The gas cleaning system may also include at least one second filter vessel capable of operating at a second temperature that is less that the first temperature for removing a portion of at least one contaminant from the feedstock gas. In at least one embodiment, the second temperature may vary between about 550 degrees Fahrenheit and about 950 degrees Fahrenheit. The second filter vessel may be formed from one or more filter elements.

The gas cleaning system may also include at least one third filter vessel capable of operating at a third temperature that is less that the second temperature for removing a portion of at least one contaminant contained in the feedstock gas. In at least one embodiment, the third temperature may vary between about 300 degrees Fahrenheit and about 550 degrees Fahrenheit. The third filter vessel may be formed from one or more filter elements.

During operation, the gas cleaning system may receive a feedstock gas from a feedstock gas source at a temperature greater than an operating temperature of at least one first filter. The temperature of the feedstock gas may be reduced, and the feedstock gas may be passed to the first filter vessel at a first temperature. The feedstock gas may be mixed with a sorbent capable of removing one or more halides from the feedstock gas. The halides in the feedstock gas may be adsorbed by the sorbents. At least a portion, if not almost all, of particulates contained in the feedstock gas may be removed and at least a portion of the at least one halide contained in the feedstock gas may be removed while the feedstock gas is contained in the first filter vessel. The halides may be removed by the filter element in the first filter vessel filtering out the sorbent particulates and the attached halides.

The feedstock gas may then be sent to a desulfurization system for removing at least a portion of the sulfur contained in the feedstock gas. The feedstock gas may be mixed with one or more sorbents capable of removing sulfur from the feedstock gas. The desulfurization system may remove a portion of the sulfur contained in the feedstock gas. In at least one embodiment, the desulfurization system may remove most of the sulfur contained in the feedstock gas. The feedstock gas may then be emitted from the desulfurization system.

The temperature of the feedstock gas may then be reduced to a second temperature that is lower than the first temperature. The feedstock gas may be passed through a second filter vessel for removing at least a portion of the contaminants contained in the feedstock gas. The feedstock gas may be mixed with one or more sorbents for removing halides, sulfur, and other contaminants. The second filter vessel may remove a portion of at least one contaminant from the feedstock gas. In at least one embodiment, the second filter vessel may be used to remove relatively small concentrations of halides, sulfur, or other contaminants.

The temperature of the feedstock gas may then be reduced to a third temperature that is lower than the second temperature. The feedstock gas may be passed through a third filter vessel for removing at least a portion of the contaminants, which may include, but is not limited to, mercury, contained in the feedstock gas. The feedstock gas may be mixed with one or more sorbents for removing halides, sulfur, and other contaminants. The third filter vessel may remove a portion of at least one contaminant, which may be, but is not limited to, mercury, from the feedstock gas.

As previously stated, the gas cleaning system may be used in various applications requiring a feedstock gas with reduced levels of contaminants. Embodiments of the gas cleaning process adapted for use with chemical synthesis applications, for use with power generation applications, and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
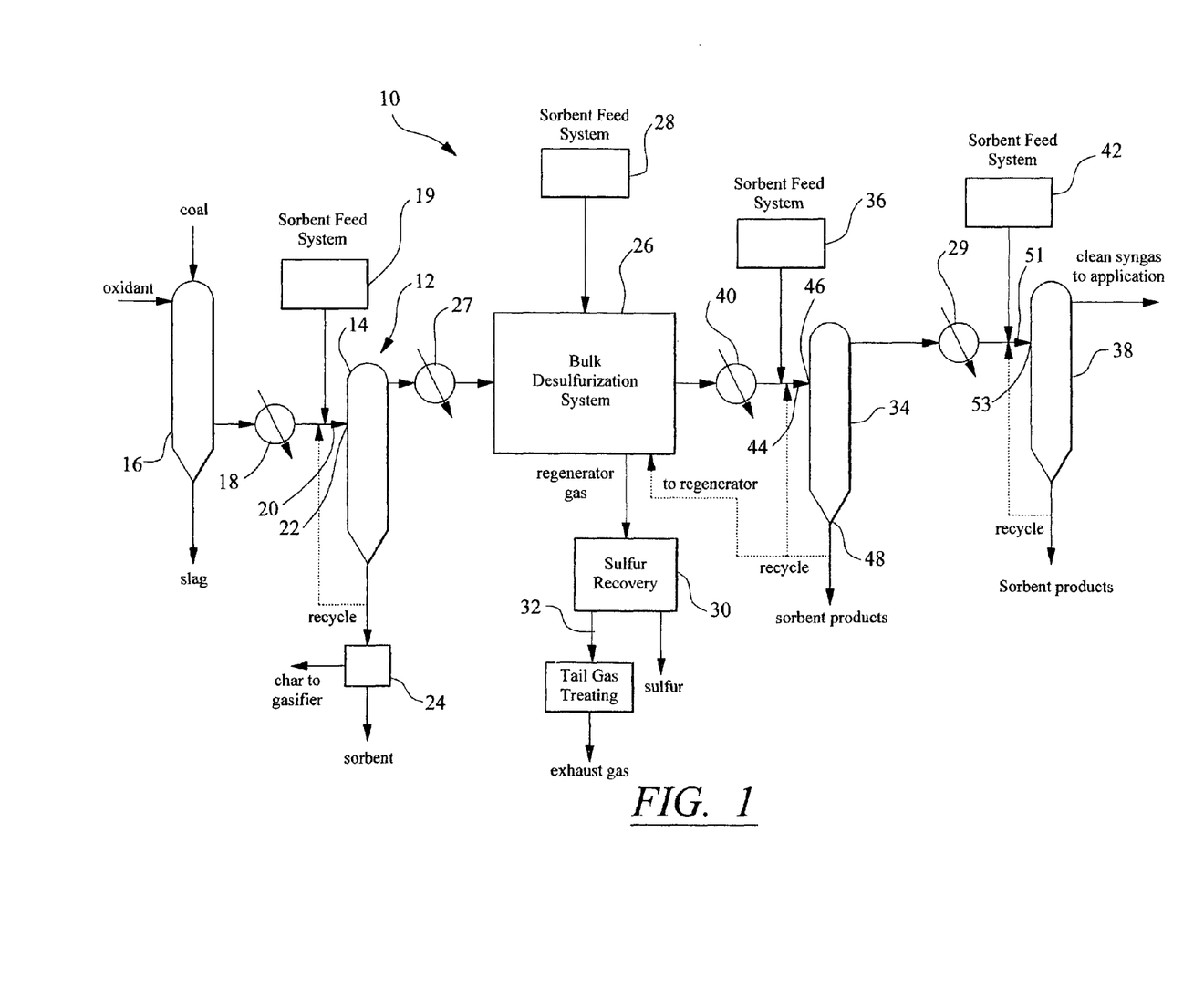
FIG. 1 is a schematic diagram of a gas cleaning system including aspects of this invention.
Figure 2:
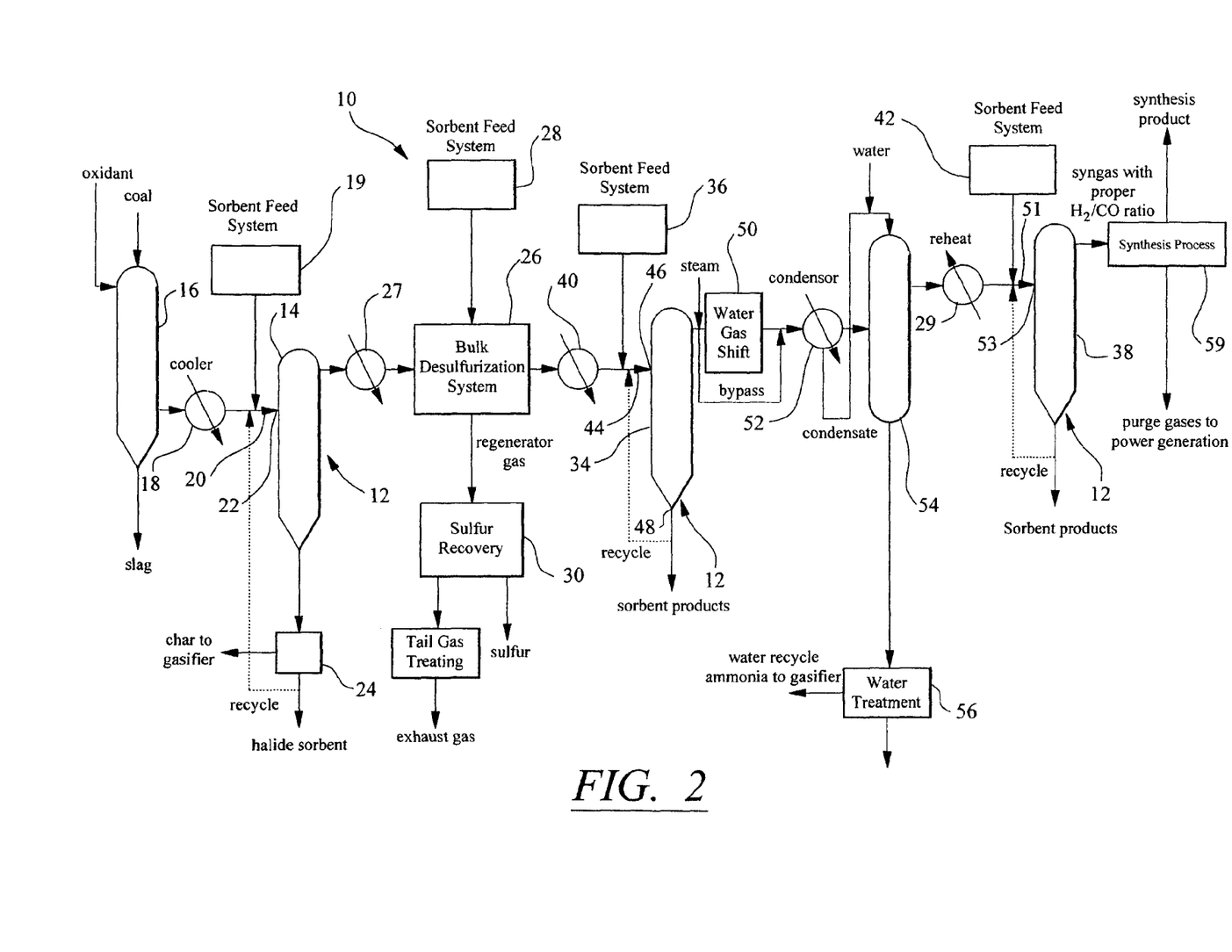
FIG. 2 is a schematic diagram of an alternative embodiment of the gas cleaning system adapted to be used in chemical synthesis applications.
Figure 3:
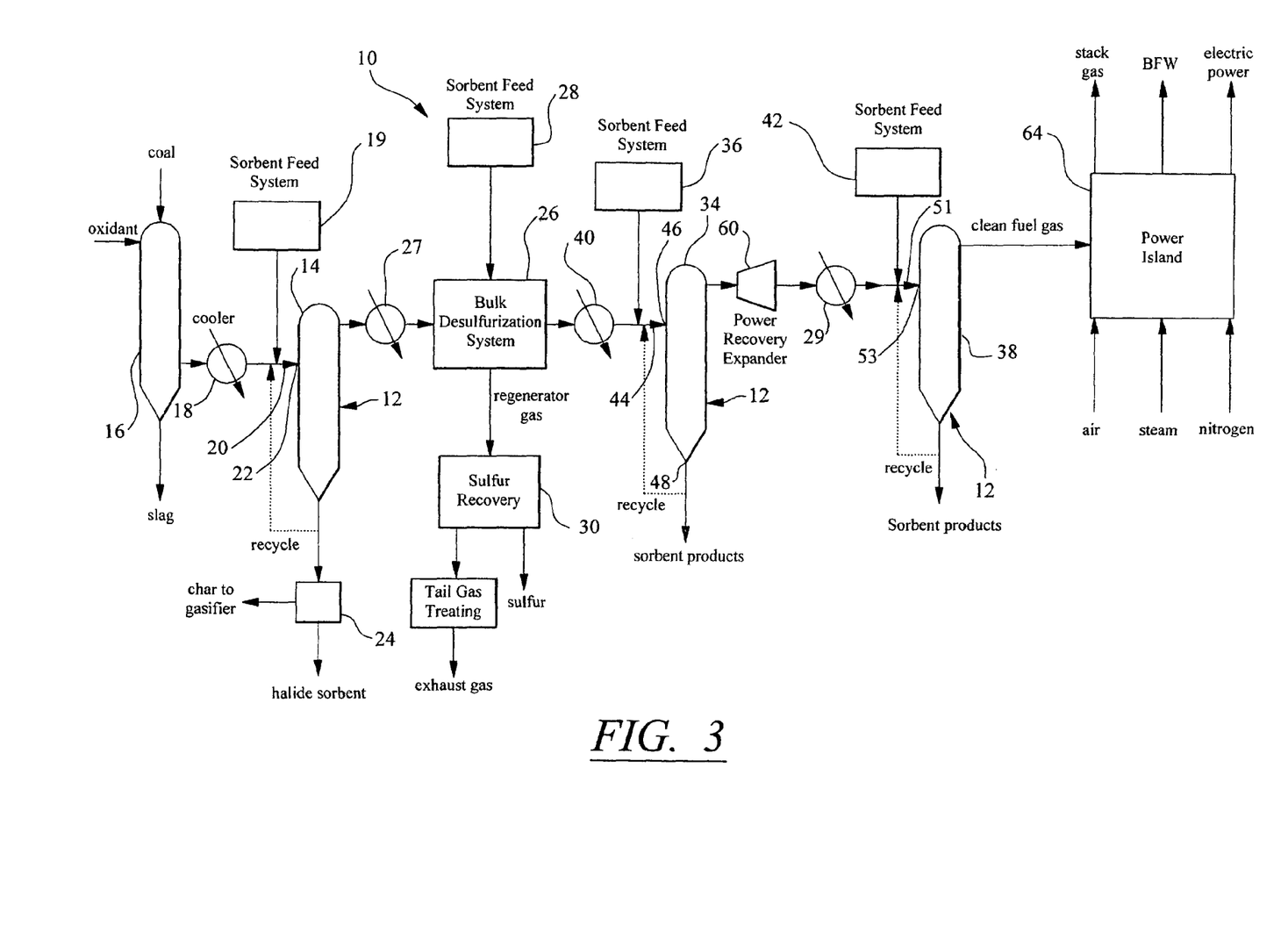
FIG. 3 is a schematic diagram of yet another alternative embodiment of the gas cleaning system adapted to be used in IGCC power generation applications.

As shown in FIGS. 1–3, this invention is directed to systems and methods for cleaning feedstock gas, such as syngas or other gases. Syngas may be defined as any gas produced through gasification of a biomass, such as, but not limited to, coal, oil and natural gas, by the application of high temperature and steam. In particular, in at least one embodiment, the systems and methods may reduce concentrations of halides, sulfur, particulate, and mercury contained in the feedstock gas to levels at or below governing guidelines. Feedstock gas may be produced for a variety of applications, such as, but not limited to: synthesis of chemicals, such as, but not limited to, methanol, ammonia, and hydrogen; fuel cell power generation; IGCC power generation; and the like.

As shown in FIGS. 1–3, the gas cleaning system 10 may include a plurality of filter vessels 12 for removing one or more of the constituents previously mentioned or others from feedstock gas. The filter vessels 12 may also be referred as barrier filter vessels. In general, the filter vessels 12 operate by removing sorbent particulate and suspended particulates from the feedstock gas, which in turn removes one or more chemicals that have attached to the sorbent particulates. Filter vessels 12 may be capable of removing a portion of various gas phase constituents and almost all particulate constituents.

As shown in FIG. 1, the gas cleaning system 10 may include one or more first filter vessels 14. The first filter vessel 14 may include one or more filter elements. In one embodiment, the first filter vessel 14 may be composed of numerous filter elements. In at least one embodiment, the first filter element may be one of many commercial ceramic or metal candle-type, or alternative filter elements. The first filter element may have a cylindrical cross-section, a diameter of about 60 millimeters, and a length between about 1.5 meters and about 2.0 meters. The first filter element may have a variety of pore sizes as well. An exemplary filter element is manufactured by the Pall Corporation in East Hills, N.Y.

The first filter vessel 14 may be coupled to a feedstock gas source 16, which may be, but is not limited to, a gasifier, such as, a coal gasifier, and may be, but is not limited to, an oxygen-blown, slagging gasifier. The feedstock gas source 16 may produce feedstock gas at various temperatures and pressures for varying applications. In at least one embodiment, the feedstock gas source 16 may produce feedstock gas at temperatures between about 1,900 degrees Fahrenheit and about 2,600 degrees Fahrenheit and at pressures between about 400 pounds per square inch atmosphere (psia) and about 1,600 psia.

Typically, the feedstock gas contains high concentrations of contaminants such as, but not limited to, sulfur, halides species, slag and char particulates, moderate concentrations of contaminants such as, but not limited to, nitrogen species, such as, but not limited to, ammonia and hydrogen cyanide, and trace concentrations of contaminants such as, but not limited to, mercury, arsenic, and selenium. In at least one embodiment, the feedstock gas may have an initial concentration of sulfur between about 8,000 parts per million by volume (ppmv) and about 10,000 ppmv, an initial halide concentration between about 420 ppmv and 500 ppmv, and an initial mercury concentration between about 0.014 ppbv and 3 ppbv.

The first filter vessel 14 may receive feedstock gas from the feedstock gas source 16. In at least one embodiment, the first filter vessel 14 may operate at temperatures between about 700 degrees Fahrenheit and about 1,200 degrees Fahrenheit. In one embodiment, the operating temperature of the feedstock gas may be about 1,100 degrees. In this embodiment, a temperature control device 18 may be coupled between the feedstock gas source 16 and the first filter vessel 14 to reduce the temperature and pressure of the feedstock gas before the feedstock gas enters the first filter vessel 14. The temperature control device 18 may be, but is not limited to, a heat exchanger, which may be an indirect heat exchanger, or a quench method device.

The feedstock gas may be mixed with a first sorbent that may be supplied by first sorbent supply system 19 as the feedstock gas enters the first filter vessel 14. The sorbent may be mixed with the feedstock gas in numerous manners. In at least one embodiment, the sorbent may be mixed with the feedstock gas by passing the sorbent into a pipe leading upstream of one or more nozzles 20 positioned at an inlet 22 to the first filter vessel 14. Alternatively, the sorbent may be contained in the first filter vessel 14 and may be mixed with the feedstock gas as the gas enters the first filter vessel 14 through inlet 22.

The sorbent may be a halide sorbent for removing one or more halides from the feedstock gas. In at least one embodiment, the sorbent may be a −325 mesh halide sorbent, such as, but not limited to, a sodium-containing mineral, such as, trona or nacholite. The sorbent may have particulates having a maximum size less than or equal to about 60 mesh, having diameters less than about 250 µm, and the sorbent may have particulates having a minimum size less than or equal to about a 325 mesh, which equates to diameters less than about 44 µm.

The feedstock gas, which may include suspended char particles and sorbent, may circulate and react in the first filter vessel 14. The sorbent particles mix with the syngas within the vessel before they deposit on the filter elements. The residence time of the mixture of feedstock gas, suspended particles, and sorbent may vary between about 1 second and about 10 seconds, before the suspended char particles and halide sorbent are deposited on a surface of the one or more filter elements contained in the first filter vessel 14. The contact time of the feedstock gas with the deposited sorbent particles on the filter elements is 0.1 second to about 1 second. In at least one embodiment, sorbent particles chemically react with and physically adsorb halide species, such as, but not limited to, primarily HCl, smaller amounts of HBr, and other halides, such as, iodine, fluorine, and others, to form solid sorbent particles having attached halides. The feedstock gas passes through the filter elements contained in the first filter vessel 14 and the solid sorbent particles are filtered out by the filter elements. A sorbent-rich filter cake may form a substantially uniform formation on the filter elements. The sorbent-rich filter cake may function as a packed bed and may have a large surface area capable of providing a contact time up to about one second or more for the feedstock gas as it passes through the filter elements. The sorbent-rich filter cake may continually grow in thickness as more sorbent is deposited during operation of the gas cleaning system 10.

In at least one embodiment, the filter elements may be cleaned during normal operation of the filter vessel 14 using, for instance and not by means of limitation, pulse gas injection on a portion of the filter elements. Preferably, only about ten percent of the surface area of the filter elements are cleaned during a single cleaning process so as not to destroy the entire sorbent-rich filter cake. The interval between cleanings varies based on the contaminant content in the sorbent, and may vary between about 15 minutes to 100 hours. Removal of halide laden sorbent particles from a greater percentage of surface area of the filter elements may negatively effect performance of the filter elements. In particular, the sorbent-rich filter cake functions as a pack-bed reactor on the filter member. Removal of more than ten percent of the surface area of the filter cake may negatively affect the operation of the filter cake and filter elements combined. The removed particles may be sent to one or more collection hoppers 24. The collection hopper 24 may be used to separate the char particles from the sorbent particles using, for instance, a shaker, sieve, or other device.

The separated char particles may be returned to the feedstock gas source 16, and the halide laden sorbent particles may be disposed of through conventional waste systems or may be recycled by, for instance, mixing the particles with incoming feedstock in inlet 22 to increase the concentration of sorbent particles in the feedstock gas. In at least one embodiment, passing the feedstock gas through the first filter vessel 14 may remove substantially all of the particulates, to a level less than about 0.1 part per million by weight (ppmw), and may remove a substantial portion of the halides so that the remaining halide content is between about 21 ppmv and about 25 ppmv, which, in some embodiments, may equate to a reduction in halides of about 95 percent. The first filter vessel may remove additional contaminants if additional sorbents are present.

The gas cleaning system 10 may also include a bulk desulfurization system 26 for removing at least a portion, if not a substantial portion, of the sulfur contained in the feedstock gas. The bulk desulfurization system 26 may operate at temperatures between about 600 degrees Fahrenheit and about 1,000 degrees Fahrenheit and at pressures between about 300 psia and about 1,500 psia. In at least one embodiment, the preferred operating temperature may be about 1,000 degrees Fahrenheit. In yet another embodiment, the feedstock gas may be sent through a temperature control device 27 to reduce the temperature of the feedstock gas before the feedstock gas enters the bulk desulfurization system 26. Sulfur may be removed from the feedstock gas by mixing the feedstock gas with a sulfur sorbent, such as, but not limited to, a zinc-based sorbent, an iron-based sorbent, a copper-based sorbent, or other sorbents. The sulfur sorbent may be supplied by a second sorbent supply system 28. The bulk desulfurization system 26 may be capable of reducing levels of sulfur in the feedstock gas to between about 20 ppmv and about 50 ppmv, and more specifically between about 40 ppmv and about 50 ppmv, which, in some embodiments, equates to a reduction of sulfur of about 99.5 percent from an initial concentration.

A regenerator may be contained in the bulk desulfurization system 26, and the bulk desulfurization system 26 may be coupled to a sulfur recovery system 30 for recovering sulfur, which may be in the form of elemental sulfur, sulfuric acid, calcium sulfate, or other form, from the sorbent received from the bulk desulfurization system 26. The sulfur recovery system 30 may produce an exhaust gas stream 32 that may be treated to minimize emissions. The regenerator in the bulk desulfurization system 26 may react the sorbent particles containing the removed sulfur with oxygen or steam to generate a sulfur rich gas suitable for treatment in a sulfur recovery system. The regenerated sorbent particles may be recycled to be used for additional desulfurization. Alternatively, the exhaust gas stream 32 may be sent to the feedstock gas source 16.

The gas cleaning system 10 may also include one or more second filter vessels 34 for receiving the feedstock gas from the bulk desulfurization system 26. The second filter vessel 34 may be used to remove one or more contaminants, such as, but not limited to, sulfur, halides, mercury, and other contaminants from the feedstock gas. The second filter vessel 34 may be used primarily to remove concentrations of halides and sulfur not removed in the first filter vessel 14 and in the bulk desulfurization system 26. A temperature control device 40 may be positioned between the second filter vessel 34 and the bulk desulfurization filter vessel 26 to reduce the temperature of the feedstock gas emitted from the bulk desulfurization system 26 before the gas enters the second filter vessel 34.

Sorbents may be mixed with the feedstock gas in numerous manners, which may include, but is not limited to, being injected into pipes before the second filter vessel through nozzles, being contained in pipes before the second filter vessel to be mixed with the feedstock gas, or other manner. The sorbents may be stored in a third sorbent supply system 36. The sorbent may be any sorbent capable of removing at least sulfur from the feedstock gas. In at least one embodiment, the sorbent may be a zinc-based sorbent, an iron-based sorbent, or a copper-based sorbent. The sorbents may be a mesh size varying between a maximum size of about a 60 mesh size and minimum size of about a 325 mesh size. The sorbents may be, but are not limited to, activated carbons, promoted-activated carbon impregnated with iodine, sulfur, or other species, zinc-based sorbents, sodium-based sorbents, or any other physical or chemical adsorbents capable of effectively removing mercury, or other trace elements, such as, but not limited to arsenic, selenium, sulfur and others. In one embodiment, the sorbent injected into the feedstock gas may be a zinc-based sorbent for removing sulfur and a sodium-based sorbent for removing halides.

The sorbent may react with contaminants in the feedstock gas. The sorbent particles and attached contaminants may be filtered out of the feedstock gas as the feedstock gas is passed through filter elements contained in the second filter vessel 34. The sorbent may react with the sulfur contained in the feedstock gas, which may be, but is not limited to, $H_2S$ having lower levels of COS and other sulfur species, to form a solid reaction product. In at least one embodiment, the sorbent used in the second filter vessel 34 may be cheaper than the sorbent used in the bulk desulfurization system 26 because the sorbent used in the second filter vessel 34 consists of fine particulates and is not used in a regeneration process, and thus, does not have high regenerability, long-term stability, or attrition resistance.

In another embodiment, a sorbent capable of removing halides may also be injected into the feedstock gas in the second filter vessel 34 to remove at least a portion of any remaining halides from the feedstock gas. The sorbent may be the same sorbent used in the first filter vessel 14 or may be another halide removing sorbent. In at least one embodiment, the preferred sorbent is the same sorbent used in the first filter vessel 14.

The amount of sulfur removed from the feedstock gas by the second filter vessel 34 may be about one to two orders of magnitude less than the amount of sulfur removed from the bulk desulfurization system 26. The solids produced by the second filter vessel 34 may be recycled by sending the solids to nozzle 44 upstream of the inlet 46 of the second filter vessel 34, which may provide a higher sorbent concentration in the feedstock gas entering inlet 46. The sorbent may be drained from the second filter vessel 34 at outlet 48 and may be disposed or sent to feedstock gas source 16, where the sorbent may be included in slag produced by feedstock gas source. Alternatively, the sorbent may be deposited in the sorbent regenerator of the bulk desulfurization system 26, where at least a portion of the sulfur contained in the sorbent may be removed from the sorbent. The sorbent produced by the sorbent regenerator may be returned to the second filter vessel 34.

In at least one embodiment, the temperature control device 40 may reduce the temperature of the feedstock gas emitted from the bulk desulfurization vessel 26 to between about 550 degrees Fahrenheit and about 950 degrees Fahrenheit. The second filter vessel 34 may operate at temperatures varying between about 550 degrees Fahrenheit and about 950 degrees Fahrenheit and at pressures between about 300 psia and about 1,500 psia. In at least one embodiment, the preferred temperature of the second filter vessel may be about 900 degrees Fahrenheit. The second filter may be capable of emitting feedstock gas having less than about 0.1 ppmw particulates, a concentration of sulfur between about 1 parts per million by volume (ppmv) and about 0.8 ppmv, which may, in some embodiments, equate to removal of about 98 percent of a total concentration of sulfur, a concentration of halides between about 1 ppmv and about 0.8 ppmv, which may, in some embodiments, equate to a removal of about 96 percent of a total concentration of halide, and a mercury concentration between about 0.014 parts per billion volume (ppbv) and about 3 ppbv.

The gas cleaning system 10 may also include one or more third filter vessels 38 for receiving the feedstock gas from the second filter vessel 34. The third filter vessel 38 may be used to remove one or more contaminants, such as, but not limited to, sulfur, halides, mercury, and other contaminants from the feedstock gas. In at least one embodiment, the third filter vessel 38 may be used to primarily remove at least mercury. Sorbents may be mixed with the feedstock gas in numerous manners, which may include, but is not limited to, being injected into pipes before the second filter vessel through nozzles, being contained in pipes before the second filter vessel to be mixed with the feedstock gas, or other manner. The sorbents may be stored in a fourth sorbent supply system 42. In at least one embodiment, the sorbent may be mixed with the feedstock gas by passing the sorbent into a pipe upstream of one or more nozzles 51 positioned at an inlet 53 to the third filter vessel 38. The third filter vessel 38 may operate at a temperature between about 300 degrees Fahrenheit and about 550 degrees Fahrenheit and at pressures between about 300 psia and about 1,500 psia. In at least one embodiment, the preferred temperature of the second filter vessel may be about 400 degrees Fahrenheit.

The sorbents may be, but are not limited to, activated carbons, promoted-activated carbon impregnated with iodine, sulfur, or other species, zinc-based sorbents, sodium-based sorbents, or any other physical or chemical adsorbents capable of effectively removing mercury, or other trace elements, such as, but not limited to arsenic, selenium, sulfur and others. In at least one embodiment, the sulfur sorbent may be zinc-based, the halide sorbent may be sodium-based, and the mercury sorbent may be activated carbon. The sorbent may react with contaminants in the feedstock gas. The sorbent particles and attached contaminants may be filtered out of the feedstock gas as the feedstock gas is passed through filter elements contained in the third filter vessel 38. The third filter vessel 38 may be capable of emitting feedstock gas having less than about 0.1 ppmw particulates, concentrations of sulfur between about 0.04 ppmv and about 0.05 ppmv, which may, in some embodiments, equate to a reduction in sulfur of about 95 percent, concentrations of halides between about 1 ppmv and about 0.01 ppmv, less than about 10 ppmv ammonia, less than about 10 ppbv HCN, and concentrations of mercury between about 0.0007 ppbv and about 0.15 ppbv, which may, in some embodiments, equate to a reduction in mercury of about 95 percent.

The gas cleaning system 10 may be used in numerous applications. For instance, as previously mentioned, the gas cleaning system 10 may be used for synthesis of chemicals, such as but not limited to, methanol, ammonia, and hydrogen; fuel cell power generation; integrated gasification combined cycle (IGCC) power generation; and the like. Exemplary embodiments of the gas cleaning system 10, which are modifications of the above-described system, are described below and include systems adapted for synthesis of chemicals and for IGCC power generation applications.

Exemplary Embodiment Usable for at Least Chemical Synthesis

As shown in FIG. 2, the gas cleaning system 10 may be configured to be used to clean feedstock gas to be used in chemical synthesis. The gas cleaning system 10 may be configured as previously described. For instance, the gas cleaning system 10 may include a first filter vessel 14 including one or more filter elements for receiving a feedstock gas from a feedstock gas source 16. First filter vessel may include numerous filter elements in at least one embodiment. A sorbent may be mixed with the feedstock gas in the first filter vessel 14 to facilitate removal of halides from the feedstock gas at a first temperature. The first filter vessel 14 may be capable of removing at least char particulates and halides from the feedstock gas.

The gas cleaning system 10 may include a bulk desulfurization system 26 for removing at least a portion of the sulfur contained in the feedstock gas, and may remove a substantial portion of the sulfur. The bulk desulfurization system 26 may be any system capable of removing a substantial amount of sulfur from a feedstock gas and preferably operates at a temperature that is either equal to or less than the operating temperature, referred to as the first temperature, of the first filter vessel 14. The sulfur removed from the feedstock gas by the bulk desulfurization system 26 may be recovered in a sulfur recovery system 30. The feedstock gas may be passed directly to the second filter vessel 34, as discussed above, from the bulk desulfurization system 26, as shown in FIG. 2. The second filter vessel 34 may be used to remove sulfur from the feedstock gas that was not removed by the bulk desulfurization system 26.

The gas cleaning system 10 adjusted for chemical synthesis may be include a system for adjusting a $H_2/CO$ ratio of the feedstock gas to meet the requirements of chemical synthesis processes. In one embodiment, the $H_2/CO$ ratio may be controlled using a water-gas shift reactor 50, as shown in FIG. 2. The water-gas shift reactor 50 may have an inlet temperature that is about 700 degrees Fahrenheit and an outlet temperature of about 400 degrees Fahrenheit and operating at a pressure between about 300 psia and about 1,500 psia. The water-gas shift reactor 50 is not limited to operating at these temperatures, but may operate at other temperatures as well. The operating pressure may vary outside this enumerated range as well.

The feedstock gas may exit the water-gas shift reactor 50 and be sent to a condenser 52. The condenser 52 cools the feedstock gas, which causes a substantial portion, if not all, of the water vapor to condense. The feedstock gas may be sent to a scrubber 54 to remove one or more contaminants from the feedstock gas by contacting the gas with water. In at least one embodiment, the scrubber 54 may remove at least a portion of the ammonia, halides, sulfur, and volatile metals from the feedstock gas. The scrubber may use packed bed reactors, tray-type column reactors, or other reactors.

The water produced by the scrubber 54 may contain low concentrations of ammonia, halides, and other acidic constituents. The water may be sent to a water treatment system 56 to remove at least a portion of the contaminants from the water. The water treatment system 56 may remove the ammonia using heat in a steam stripping process or other process. The ammonia may be recovered and used for a variety of purposes, such as in other processes in a plant, sold to other parties, or recycled by sending the ammonia to the feedstock gas source 16. The water produced by the water treatment system 56 may be recycled by sending the water to the scrubber 54, or may be used in the slurry feeding fuel, such as coal, to the feedstock gas source 16.

Feedstock gas exiting the scrubber 54 may be sent through a temperature control device 29. In at least one embodiment, the feedstock gas is heated to a temperature between about 100 degrees Fahrenheit and about 550 degrees Fahrenheit. The temperature control device 29 may be any device capable of heating the feedstock gas to a final temperature falling within this temperature range. In at least one embodiment, the temperature control device 29 may heat the cooled feedstock gas received from the scrubber 54 using a feedstock gas stream found before the water-gas shift reactor 50 in the gas cleaning system 10.

Feedstock gas exiting the temperature control device 29 may be sent to the third filter vessel 38. The third filter vessel 38 may remove at least a portion of the mercury contained in the feedstock gas and a portion of the remaining sulfur species in the feedstock gas. Sorbents may be injected into the feedstock gas from the fourth sorbent supply system 42. The sorbents may be, but are not limited to, activated carbon, a zinc-based sulfur sorbent, promoted-activated carbons impregnated with iodine, sulfur, or other species, and other physical or chemical adsorbents effect for removing mercury and other trace elements, such as arsenic, selenium, sulfur and others. Once used in the third filter vessel 38, the sorbents may be disposed or may be treated to release the concentrated trace elements. The gas cleaning system 10 can produce feedstock gas having contaminant concentrations as low as less than about 0.1 ppmw particulates, concentrations of sulfur between about 0.04 ppmv and about 2 ppmv, concentrations of halide between about 1 ppbv and about 2 ppmv, concentrations of ammonia between about 1 ppmv and about 100 ppmv, concentrations of HCN between about 10 ppbv and about 2 ppmv, and between about a 95% and about a 99% reduction in the amount of mercury in the feedstock gas.

The feedstock gas may exit the third filter vessel 38 and be sent to a chemical synthesis process step 59. The feedstock gas may be cooled, dried, compressed, have major constituents removed, such as $CO_2$ and $CH_4$, or otherwise manipulated before undergoing catalytic reaction and purification to generate the final chemical synthesis product.

The gas cleaning system 10 configured to be used for chemical synthesis applications reduces the amount of heat transfer needs typically found in conventional systems. In particular, less feedstock gas reheating is needed, and no feedstock gas refrigeration is used. Generally, the temperature and pressure of the feedstock gas in the gas cleaning system 10 gradually drops throughout the system 10 until reaching the water-gas shift reactor 50 and the condenser 52, where only moderate reheating may be required. As a result the cost associated with operating the gas cleaning system may be much less than conventional systems.

Exemplary Embodiment Usable for at Least Power Generation Applications

As shown in FIG. 3, the gas cleaning system 10 may be configured to be usable in power generation applications, such as but not limited to, fuel cell power generation applications and IGCC power generation applications. As shown in FIG. 3 this embodiment of the gas cleaning system 10 includes a first filter vessel 14 coupled to a feedstock gas source 16. The feedstock gas source 16 may be a slagging gasifier that may operate at a pressure between about 400 psia and about 800 psia or at a pressure between about 400 psia and about 1,200 psia if a $CO_2$ capture and sequester method is used. The feedstock gas source 16 may operate at a temperature between about 1,900 degrees Fahrenheit and about 2,600 degrees Fahrenheit.

The feedstock gas may be cooled in a first temperature control device 18 positioned between the feedstock gas source 16 and the first filter vessel 14. In at least one embodiment, the feedstock gas may be cooled to a temperature between about 700 degrees Fahrenheit and about 1,200 degrees Fahrenheit. A substantial portion of the halides contained in the feedstock gas may be removed using the first filter vessel 14. As described in detail above, a halide sorbent may be mixed with the feedstock gas and the mixture passed through one or more filter elements contained in the first filter vessel 14. In at least one embodiment, the first filter vessel 14 may include numerous filter elements. The halide concentration in the feedstock gas may be reduced to a concentration between about 10 ppmv and about 50 ppmv. The halide concentration in the feedstock may be reduced to lower levels, but lower levels are not required by guidelines governing IGCC power generation.

The gas cleaning system 10 adapted for use for power generation may also include a bulk desulfurization system 26 for receiving feedstock from the first filter vessel 14. The bulk desulfurization system 26 may operate at a temperature between about 600 degrees Fahrenheit and about 1,000 degrees Fahrenheit and a pressure between about 300 psia and about 1,200 psia. The bulk desulfurization system 26 may be any desulfurization system capable of operating within this temperature range, as previously described. The bulk desulfurization system 26 may reduce sulfur content in the feedstock gas to a concentration between about 20 ppmv and about 50 ppmv.

As with the gas cleaning system 10 adapted for chemical synthesis, the gas cleaning system 10 shown in FIG. 3 and adapted for power generation may include a second filter vessel 34 positioned downstream of the bulk desulfurization system 26. The second filter vessel 34 may include one or more filter elements, as previously described. In at least one embodiment, the second filter vessel 34 may include numerous filter elements. The second filter vessel 34 may also operate at temperatures between about 650 degrees Fahrenheit and about 950 degrees Fahrenheit. Before the feedstock gas is sent into the second filter vessel 34, the feedstock gas is passed through a third temperature control device 40 to slightly cool the feedstock gas emitted from the bulk desulfurization system 26. The second filter vessel 34 may remove sulfur from the feedstock gas not previously removed by the bulk desulfurization system 26, using a sulfur sorbent, such as, but not limited to a zinc-based sorbent, an iron-based sorbent, a copper-based sorbent, or other sorbent. Once used, the sulfur sorbent may be sent to the regenerator of the bulk desulfurization system 26 or sent to the feedstock gas source to be incorporated into the gasifier slag. Passing the feedstock gas through the second filter vessel 34 may reduce the concentration of sulfur to between about 1 ppmv and about 5 ppmv. Additional removal of sulfur is not required for power generation applications; however, if desired, the concentration of sulfur may be further reduced.

The gas cleaning system 10 shown in FIG. 3 may include a power recovery expander 60 downstream of the second filter vessel 34 for generating power and cooling the feedstock gas. The gas cleaning system 10 may also include a second temperature control device 29 for further reducing the temperature of the feedstock gas flowing from the power recovery expander 60, if necessary, to reduce the temperature of the feedstock to between about 300 degrees Fahrenheit and about 500 degrees Fahrenheit.

A third filter vessel 38 may be positioned downstream of the second temperature control device 29 for removing at least a portion of the concentrations of ammonia, mercury, and other trace elements present in the feedstock gas. The third filter vessel 38 may also remove at least a portion of contaminant products, such as metal carbonyls and pipe-corrosion particles, that may exist in the feedstock gas. Removing the contaminant products may protect the gas turbine from deposition and erosion damage. An adsorbent may be mixed with the feed stock gas to remove the contaminant. The adsorbent may be a physical-chemical adsorbent, such as, but not limited to, activated carbon or high surface area adsorbents.

The feedstock gas passing from the third filter vessel 34 may have a concentration of mercury that is between about 90% and about 95% less than an initial concentration of mercury and an ammonia concentration of about 10 ppmv. The feedstock gas emitted by the gas cleaning system 10 adapted for power generation is humid. Thus, a humidification process, such as those humidification processes used with conventional gas cleaning, is not needed. In addition, in at least one embodiment, little, if any, $CO_2$ is removed from the feedstock gas by the gas cleaning system 10. Thus, the mass flow of the feedstock delivered to the gas turbine is maintained. As the feedstock gas leaves the third filter vessel

38, the feedstock gas may be may be diluted with nitrogen or steam, or both, before being combusted in a gas turbine power island 64.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A process for cleaning feedstock gas, comprising:
   producing a feedstock gas;
   passing the feedstock gas at a first temperature to at least one first filter vessel where at least a portion of particulates contained in the feedstock gas in the at least one first filter vessel and at least a portion of at least one halide contained in the feedstock gas in the at least one first filter vessel are removed from the feedstock gas by contacting the feedstock gas with at least one sorbent capable of removing at least one halide from the feedstock gas;
   passing the feedstock gas to a bulk desulfurization system where at least a portion of sulfur contained in the feedstock gas in the bulk desulfurization system is removed by contacting the feedstock gas with at least one sorbent capable of removing sulfur from the feedstock gas;
   passing the feedstock gas at a second temperature that is less than the first temperature to at least one second filter vessel where a portion of at least one contaminant contained in the feedstock gas in the at least a one second filter vessel is removed by contacting the feedstock gas with at least one sorbent; and
   passing the feedstock gas at a third temperature that is less than the second temperature to at least one third filter vessel where a portion of at least one contaminant contained in the feedstock gas in the at least one second filter vessel is removed by contacting the feedstock gas with at least one sorbent.

2. The process of claim 1, wherein passing the feedstock gas at a first temperature to at least one first filter vessel comprises passing the feedstock gas at a first temperature between about 700 degrees Fahrenheit and at out 1,200 degrees Fahrenheit.

3. The process of claim 1, wherein passing the feedstock gas at a second temperature that is less than the first temperature to at least one second filter vessel comprises passing the feedstock gas at a second temperature between about 550 degrees Fahrenheit and about 950 Fahrenheit.

4. The process of claim 1, wherein passing the feedstock gas at a third temperature that is less than the second temperature to at least one third filter vessel comprises passing the feedstock gas at a third temperature between about 300 degrees Fahrenheit and about 550 degrees Fahrenheit.

5. The process of claim 1, further comprising passing the feedstock gas through at least one condenser between the at least one second filter vessel and the at least one third filter vessel.

6. The process of claim 5, further comprising heating the feedstock gas to the third temperature after the feedstock gas exits the condenser and before the gas enters the at least one third filter vessel.

7. The process of claim 5, further comprising passing the feedstock gas through at least one scrubber.

8. The process of claim 1, further comprising passing the feedstock gas through a water-gas shift reactor, having an inlet temperature of about 700 degrees Fahrenheit and an outlet temperature of about 400 degrees Fahrenheit, located between the at least one second filter vessel and the at least one third filter vessel.

9. The process of claim 1, further comprising passing the feedstock gas through at least one power recovery expander between the at least one second filter vessel and the at least one third filter vessel.

10. The process of claim 1, wherein removing at least a portion of particulates contained in the feedstock gas in the at least one first filter vessel and removing at least a portion of at least one halide contained in the feedstock gas in the at least one first filter vessel results in the feedstock gas having particulates less then about 0.1 ppmw and a halide content less than about 5 ppmv.

11. The process of claim 1, wherein removing at least a portion of contaminants contained in the feedstock gas in the at least one third filter vessel results in the feedstock gas having particulates less than about 0.1 ppmw, less than about 60 ppbv sulfur, less than about 10 ppbv halide, less than about 10 ppmv ammonia, less than about 10 ppbv HCN, and less than about 99 percent of a mercury content of a fuel source used to produce the feedstock gas.

12. The process of claim 1, further comprising emitting a feedstock gas from the at least one third filter vessel having a concentration of carbon dioxide substantially equal to an initial carbon dioxide concentration in the feedstock gas produced by the gasifier and having a concentration of water substantially equal to an initial water concentration in the feedstock gas produced by the gasifier.

13. A system for cleaning feedstock gas, comprising:
    at least one first filter vessel capable of operating at a first temperature and removing at least a portion of particulates contained in the feedstock gas and capable of removing at least a portion of at least one halide using at least one sorbent mixed with the feedstock gas;
    at least one desulfurization system capable of operating substantially at the first temperature for removing at least a portion of sulfur contained in the feedstock gas and positioned downstream of at least one first filter vessel;
    at least one second filter vessel capable of operating at a second temperature that is less than the first temperature for removing a portion of at least one contaminant contained in the feedstock gas and positioned downstream of the at least one desulfurization system; at least one third filter vessel capable of operating at a third temperature that is less than the second temperature for removing a portion of at least one contaminant contained in the feedstock gas and positioned downstream of the at least one second filter vessel; and
    at least one water scrubber for removing contaminants from the feedstock gas emitted from the at least one third filter vessel.

14. A system for cleaning feedstock gas, comprising:
    at least one first filter vessel capable of operating at a first temperature and removing at least a portion of particulates contained in the feedstock gas and capable of removing at least a portion of at least one halide using at least one sorbent mixed with the feedstock gas;
    at least one desulfurization system capable of operating substantially at the first temperature for removing at least a portion of sulfur contained in the feedstock gas and positioned downstream of at least one first filter vessel;
    at least one second filter vessel capable of operating at a second temperature that is less than the first temperature for removing a portion of at least one contaminant contained in the feedstock gas and positioned downstream of the at least one desulfurization system; and at least one third filter vessel capable of operating at a third temperature that is less than the second temperature for removing a portion of at least one contaminant contained in the feedstock gas and positioned downstream of the at least one second filter vessel; and at least one condenser between the at least one second filter vessel and the at least one third filter vessel.

15. A system for cleaning feedstock gas, comprising:

at least one first filter vessel capable of operating at a first temperature and removing at least a portion of particulates contained in the feedstock gas and capable of removing at least a portion of at least one halide using at least one sorbent mixed with the feedstock gas;

at least one desulfurization system capable of operating substantially at the first temperature for removing at least a portion of sulfur contained in the feedstock gas and positioned downstream of at least one first filter vessel;

at least one second filter vessel capable of operating at a second temperature that is less than the first temperature for removing a portion of at least one contaminant contained in the feedstock gas and positioned downstream of the at least one desulfurization system; and at least one third filter vessel capable of operating at a third temperature that is less than the second temperature for removing a portion of at least one contaminant contained in the feedstock gas and positioned downstream of the at least one second filter vessel; and at least one water-gas shift reactor located between the at least one second filter vessel and the at least one third filter vessel.

16. A system for cleaning feedstock gas, comprising:

at least one first filter vessel capable of operating at a first temperature and removing at least a portion of particulates contained in the feedstock gas and capable of removing at least a portion of at least one halide using at least one sorbent mixed with the feedstock gas;

at least one desulfurization system capable of operating substantially at the first temperature for removing at least a portion of sulfur contained in the feedstock gas and positioned downstream of at least one first filter vessel;

at least one second filter vessel capable of operating at a second temperature that is less than the first temperature for removing a portion of at least one contaminant contained in the feedstock gas and positioned downstream of the at least one desulfurization system; and at least one third filter vessel capable of operating at a third temperature that is less than the second temperature for removing a portion of at least one contaminant contained in the feedstock gas and positioned downstream of the at least one second filter vessel; and at least one power recovery expander between the at least one second filter vessel and the at least one third filter vessel.

* * * * *